United States Patent Office

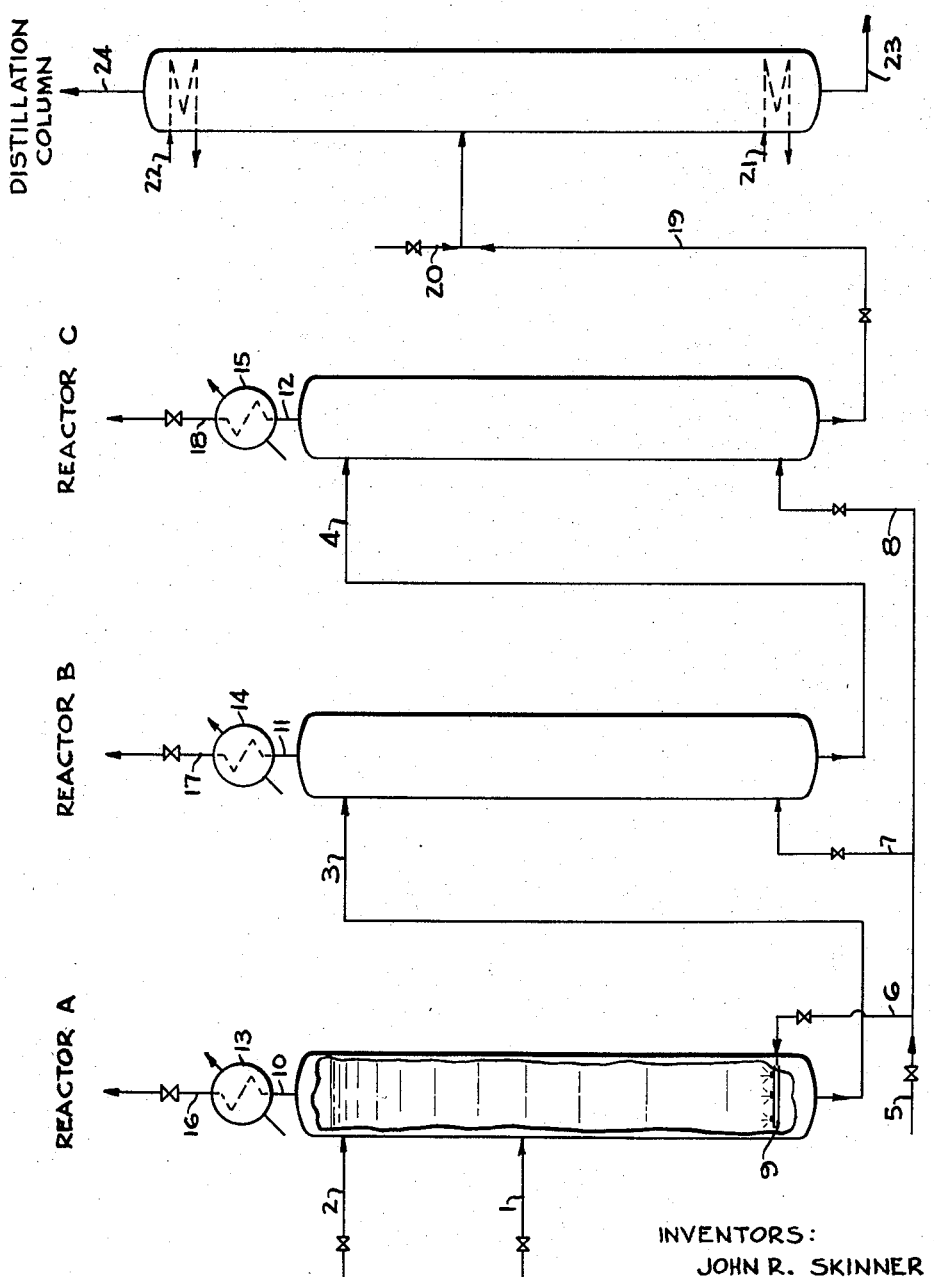

2,871,103
METHOD FOR THE PRODUCTION OF HYDROGEN PEROXIDE

John R. Skinner, Oakland, and Shelton E. Steinle, Richmond, Calif., assignors to Shell Development Company, New York, N. Y., a corporation of Delaware Application December 23, 1953, Serial No. 399,868

10 Claims. (Cl. 23—207)

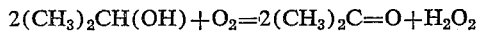

This invention pertains to a method for the production of hydrogen peroxide. More particularly, the present invention pertains to a method for the production of hydrogen peroxide by liquid-phase, non-catalytic, partial oxidation of secondary alcohols, particularly isopropyl alcohol.

A process for the production of hydrogen peroxide by liquid-phase, non-catalytic, partial oxidation of secondary alcohols utilizing molecular oxygen as the oxidizing agent has been described in the copending application Serial No. 130,852, filed December 2, 1949, now abandoned, and in application Serial No. 484,864, filed January 31, 1955, as a continuing application of said Serial No. 130,852. Briefly described, the oxidation reaction which is productive of hydrogen peroxide is caused to occur by aerating the secondary alcohol in liquid phase in the presence of free radical reaction initiators, such as peroxidic compounds, while maintaining the liquid that is undergoing aeration scrupulously out of contact with substances which promote decomposition of hydrogen peroxide, at an elevated temperature and while maintaining the entire body of liquid which is undergoing aeration substantially saturated with molecular oxygen.

The principal by-product which is formed in the process of the above-mentioned copending application is the ketone which corresponds in number and arrangement of carbon atoms to the secondary alcohol used as starting material. Thus, with isopropyl alcohol, the oxidation reaction can be described by the chemical equation $$2(CH_3)_2CH(OH) + O_2 = 2(CH_3)_2C=O + H_2O_2$$

Along with this reaction there has been found to occur, although to only a very minor extent, one or more side reactions which are productive of organic acids, apparently chiefly acetic acid where the secondary alcohol is isopropyl alcohol. These acids, even though they are formed in amounts generally in the order of but three to five percent, based upon the amount of the secondary alcohol consumed, have been found to be quite troublesome. The rate of the oxidation reaction has been found to be quite sensitive to the amount of organic acid which is present in the liquid substrate. The amount of organic acid which is produced is, in turn, quite sensitive to minor variations in the reaction conditions, such as the reaction temperature. Relatively minor variations in the amount of organic acid, when present in the reaction mixture in the above-indicated quantities, produce a disproportionately large effect upon the overall oxidation reaction, rendering accurate control of the oxidation reaction difficult. Also, the amount of organic acid produced may be sufficient under some conditions to cause such an acceleration of the reaction when there are present high concentrations of accumulated hydrogen peroxide that there is danger of losing all control of the reaction. Thus, the formation of organic acid tends to give rise to an upper limit, beyond which the single-pass conversion of the secondary alcohol cannot be practicably carried in large-scale operations. Since the oxidation reaction which is productive of hydrogen peroxide is both autocatalytic and exothermic, it will be readily apparent that adequate control of the reaction is a prerequisite for operation upon any large scale.

A second problem which is associated with the formation of organic acid in the reaction mixture obviously is that it is necessary ultimately to separate the organic acids from the hydrogen peroxide, at least if it is desired to produce as the final product hydrogen peroxide of any high degree of purity. The presence of the organic acid in the oxidation mixture at the above-indicated levels tends to introduce complications into the recovery of the hydrogen peroxide, which could be avoided if the amount of organic acid formed could be materially reduced.

One of the objects of the present invention, therefore, is to provide a method whereby the formation of by-product organic acids in the said liquid-phase partial oxidation of secondary alcohols to produce hydrogen peroxide can be substantially reduced. A further object is an improved continuous process for effecting such partial oxidation of secondary alcohols characterized, inter alia, by facilitated control of the reaction. A still further object is to provide a method of continuous operation on a practical scale whereby improved conversions, coupled with high yields of hydrogen peroxide, can be obtained. Further and more specific objects of the invention will become apparent from the disclosures and claims hereinafter.

In accordance with the present invention and in the accomplishment of the foregoing and other objects of the invention, there is now provided an improved process for the production of hydrogen peroxide by partial oxidation of secondary alcohols in liquid phase. The improved process comprises a multi-stage continuous operation wherein, it has been found, the amount of by-product organic acid advantageously can be substantially reduced. In carrying out the process of the present invention, a liquid stream initially consisting essentially of a secondary alcohol is passed through a succession of reaction zones each of which is maintained at reaction temperature and devoid of substances which promote decomposition of hydrogen peroxide. In each of the successive zones the liquid stream is aerated with a stream of gas containing molecular oxygen in the presence of substantially constant and, from zone to zone in succession, progressively increasing concentrations of hydrogen peroxide. Liquid product is withdrawn from the last of the successive zones and hydrogen peroxide is recovered from the withdrawn liquid product.

By carrying out the oxidation of the secondary alcohol continuously in accordance with the present invention, in a succession of stages and in the presence of progressively increasing but in each stage substantially constant concentrations of hydrogen peroxide, greatly reduced formation of organic acid has been found to result. The reaction is more susceptible to control than if the reaction is carried out batchwise or in a single oxidation stage of continuous operation to the same concentrations of hydrogen peroxide. Furthermore, it has been found that the reaction can be carried to substantially higher conversions of the input alcohol without danger of losing control of the reaction, than when carried out in a single oxidation stage. Notwithstanding the high conversions of input alcohol, high yields of hydrogen peroxide are obtained. Indeed, compared to a single-stage continuous oxidation carried to an equal conversion of the input alcohol, somewhat improved yields actually may be obtained. Production and purification of the hydrogen peroxide thus are facilitated and, where the by-product ketone is to be hydrogenated and recycled, the amount of recycle necessary in the production of any given amount of hydrogen peroxide can be materially reduced.

Each of the several successive stages of the process is carried out in a vessel or reactor appropriate for intimately contacting a massive body of liquid with a gas stream by aeration. The reaction vessel typically will be of spherical, cylindrical, oblate, ellipsoid or equivalent form, and designed for holding a quantity of liquid and passage of gas stream upwardly through the body of liquid. The vessel is equipped with inlet and outlet means for continuous introduction and withdrawal, respectively, of liquid substrate. The vessel is provided with an inlet for the stream of gas containing molecular oxygen, located at or near the bottom of the vessel and preferably equipped with a sparger or other means for finely dispersing the gas stream into and upwardly through the body of liquid contained in the vessel. Effluent gas is withdrawn overhead via an outlet at or near the top of the reactor; a condenser, such as a water-cooled condenser, preferably is provided for condensation of any volatilized alcohol and/or ketone from the effluent gas stream and reflux of the condensate to the liquid undergoing oxidation. The vessel used for each stage, and interconnecting pipes, pumps, etc., must be constructed of, or at least lined with, materials which are not incompatible with hydrogen peroxide, such as glass, porcelain, aluminum, tin, stainless steel preferably of the 300 series, or a resin. Each reactor is equipped with the necessary means for control of temperature, pressure, liquid level, and feed rates, and, of course, is so designed mechanically that it is capable of withstanding the temperatures and pressure which are involved.

In carrying out the process of the invention, a liquid stream initially consisting essentially of the secondary alcohol is passed in succession through a plurality of reaction zones or stages, each zone or stage being provided by a separate reactor of the character indicated in the preceding paragraph, or equivalent. The several reactors thus are arranged in series flow with respect to the liquid feed to the process. A separate stream of gas containing molecular oxygen is continuously introduced into each of the several reactors, as from an external manifold system leading from a pump; the effluent streams of spent gas from the several reactors may be combined and discharged through a single pressure let-down device. If desired, of course, the waste gases may be discharged through individual pressure let-down valves and, indeed, it may be advantageous so to do, since by maintaining a moderate pressure differential from stage to stage the liquid undergoing oxidation can be forced through the system without need for pumps between the successive stages. Where an artificial gas is used as the oxidizing agent, such as oxygen-enriched air or substantially pure molecular oxygen, the discharged gas may be collected, make-up oxygen added, and recycled.

The entire system before and during operation should be maintained scrupulously clean so as to avoid incidental contamination of the liquid undergoing oxidation with traces of heavy metal ions or other materials which tend to catalyze the decomposition of hydrogen peroxide. Conditioned reactors preferably are employed. The reactors may be conditioned by exhaustive washing with distilled or de-ionized water followed by repeated washing with an aqueous 30 to 50% by weight solution of hydrogen peroxide. Where the reactors are constructed of stainless steel, the surfaces which are to come into contact with the liquid undergoing oxidation preferably are scrupulously cleaned, as by treatment with hot chemically pure 10% caustic solution, passivated by treatment with hot chemically pure 30% nitric acid solution, washed with distilled or de-ionized water and, finally, conditioned by treatment with a solution of hydrogen peroxide. The surfaces of the equipment, regardless of the material of construction, also desirably are treated with a hydrogen peroxide stabilizer, as by rinsing the reaction vessels and feed lines, etc., with a dilute aqueous solution of a stabilizer for hydrogen peroxide, such as potassium pyrophosphate, sodium stannate, sodium pyrophosphate, 8-hydroxyquinoline, phosphoric acid, or trisodium phosphate. This may be done by adding the stabilizer to the hydrogen peroxide solution with which the surfaces are preliminarily treated, or by a separate rinsing step. It is believed that traces of the stabilizer are adsorbed on the surfaces and that the adsorbed stabilizer plays a material role; in order to maintain a small amount of hydrogen peroxide stabilizer in the system or adsorbed on the surfaces, small amounts of the foregoing or equivalent hydrogen peroxide stabilizers preferably are added to the liquid stream of secondary alcohol which is charged as feed to the process.

The oxidation of the secondary alcohol is carried out at elevated temperatures under a pressure sufficient to maintain the alcohol in liquid state during the aeration. The temperature in each of the reaction stages should be above about 70° C. and preferably should be above about 120° C. Temperatures as high as about 200° C. may be employed, at least in the first one or two stages and depending upon the residence time, although preferably the temperature should not be allowed to exceed about 175° C. The preferred temperature range is from about 120° C. to about 160° C. Where the alcohol is, for example, isopropyl alcohol, these temperatures evidently will be above the normal boiling point of the alcohol. In order to maintain the alcohol in liquid state, sufficient pressure is applied by forcing the oxygen-containing gas into the reactors under pressure. The pressure which is employed will depend somewhat upon the identity of the secondary alcohol that is being oxidized as well as upon the temperature. Generally speaking, pressures within the range of from about 50 to about 1000 pounds per square inch are employed.

Although in the broader aspects of the process the several reaction zones or stages may be operated at equal temperatures, or even at progressively increasing temperatures from stage to stage in the direction of the liquid flow, it is desirable, from the standpoint of maximum reduction of the formation of organic acid, to regulate the temperatures of the several reaction zones or stages so that the reaction temperature decreases progressively from zone to zone in the direction of liquid flow. For a multi-stage process conducted according to the invention, the temperature in the first zone thus may be maintained within the range of from about 150° C. to about 200° C. The succeeding reaction stages each may be maintained at a temperature between about 2° C. and about 20° C. lower than the next preceding stage with the last stage preferably being maintained within the range of from about 120° C. to about 145° C. When employing three stages in the process of the invention and utilizing temperatures within the preferred range of from about 120° C. to about 160° C., the first stage or reaction zone advantageously may be maintained at a temperature within the range of from about 140° C. to about 160° C., the second stage or reaction zone advantageously at a temperature within the range of from about 130° C. to about 140° C., and the terminal stage advantageously at a temperature within the range of from about 120° C. to about 130° C. The temperatures of the several reaction zones together with the residence times should be so adjusted that a certain defined proportion of the total conversion of the secondary alcohol occurs in each stage. Where from two to four stages are employed, it is desirable to maintain a temperature difference between the respective stages (taken in the direction of liquid flow) of from about —5° C. to about —15° C. When employing a larger number of stages than four, smaller minimum temperature differences may be employed between stages.

It is essential that there be an appreciable residence time of the liquid stream in each of the successive reaction zones. The residence time or, conversely, the rate of flow of liquid feed to each of the several reaction stages, may range from an LHSV of from about 0.05 hr.$^{-1}$ to about 3 hr.$^{-1}$ over the broader temperature range of from about 70° C. to about 200° C. and over the preferred range of from about 120° C. to about 160° C. the feed rate to each reaction stage may range from an LHSV of about 0.1 hr.$^{-1}$ to an LHSV of about 2 hr.$^{-1}$. The abbreviation LHSV refers to the liquid hourly space velocity, which is the rate of feed to the reaction zone in terms of volumes of liquid feed per volume of the liquid undergoing aeration in the reaction zone per hour, the units thus being reciprocal hours. For any desired degree of conversion of the secondary alcohol contained in the feed, the rate of feed to the reaction zone and the temperature of the reaction zone must be carefully correlated, at constant conversions and under otherwise equal conditions the feed rate and the temperature being related to each other by an inverse logarithmic relation, that is to say, the value of the necessary LHSV increases approximately logarithmically with the temperature.

The process of the invention may be carried out using any number of stages equal to $n$ where $n$ represents a small positive integer greater than 1. From two to eight or more stages may be employed. Preferably there are employed from three to five stages. Since an appreciable residence time is provided at reaction temperature in each stage, it follows that there will be an appreciable conversion to ketone and hydrogen peroxide of the secondary alcohol and molecular oxygen fed to each stage. Although the exact degree of conversion in each stage is not highly critical, it is particularly advantageous that, of the total percentage conversion of the secondary alcohol over the $n$ stages of the process, about $1/n$th occur in each stage. More generally speaking, not over about $1.8/n$th and not less than about $0.2/n$th of the total percentage conversion should occur in each of the several stages, the sum of the percentage conversions in the several stages being of course equal to the total percentage conversion.

The concentration of hydrogen peroxide in the liquid undergoing oxidation in each of the several stages will be dependent upon the cumulative percentage conversion of the secondary alcohol to and including the stage under consideration, and should be maintained substantially constant by controlling the degree of conversion of the secondary alcohol in each of the stages at a substantially constant level. Such control may be effectuated, once steady-state conditions of operation have been obtained, by minor adjustments of the temperature in each of the reaction zones.

The feed to the process will consist essentially of the secondary alcohol. Minor amounts of water may be present in the feed without detriment and, indeed, where the secondary alcohol is one that forms a constant boiling mixture with water it may be convenient to supply the constant boiling mixture as the feed so as to avoid necessity for possibly troublesome dehydration of a constant boiling mixture. Extreme care should be taken to avoid the presence of deleterious impurities in the feed to the process, such as ions of heavy metals that promote decomposition of hydrogen peroxide. The secondary alcohol preferably is distilled prior to its introduction as feed to the process. This may be done by a simple flash distillation designed to remove any non-volatilities which may be present in the alcohol. The secondary alcohol may be introduced into the first stage of the process by outside condensation of the distillate and charging the condensate or, if desired, the alcohol may be flash evaporated and the vapors introduced directly into the first stage reactor wherein they are condensed and furnish part or all of the necessary heat to the first stage of the process. There preferably is introduced in or concurrently with the secondary alcohol fed to the first stage of the process a small amount, generally less than 500 parts per million and preferably less than about 100 parts per million, of a hydrogen peroxide stabilizer. Any one or more of the various known stabilizers for hydrogen peroxide may be employed, such as potassium phosphate, sodium pyrophosphate, potassium pyrophosphate, sodium stannate, boric acid, phosphoric acid, 8-hydroxyquinoline, acetamide, or the like, the preferred stabilizers being inorganic and being the oxy-acids of phosphorus, the oxy-acids of tin, and the alkali metal salts of such oxy-acids of phosphorus and of tin.

As the secondary alcohol there may be employed a lower aliphatic secondary alcohol such as isopropyl alcohol, secondary butyl alcohol, a secondary amyl alcohol, secondary hexyl alcohol, a secondary heptyl alcohol, a secondary octyl alcohol or a secondary nonyl alcohol. Cyclic secondary alcohols may be used, such as cyclopentanol and cyclohexanol and alkyl-substituted secondary cyclopentanols and cyclohexanols. The secondary alcohol may be saturated or it may contain an unsaturated linkage, as in 1-buten-3-ol and 1-methyl propargyl alcohol. The alcohol may contain more than the one hydroxyl group, as in 2,3-butanediol and 1,3-dimethoxy-2-propanol, although the monohydric alcohols are preferred. The number of carbon atoms which the alcohol contains is not highly critical; alcohols containing from 3 to about 10 to 12 carbon atoms are in general suitable. Particularly suitable are the lower saturated aliphatic monohydric alcohols, and of these isopropyl alcohol is especially preferred.

The gas containing molecular oxygen may be air or an artificial gas containing molecular oxygen, such as oxygen-enriched air, distilled oxygen, or mixtures of oxygen and such inert gases as helium, carbon monoxide, or methane. It is essential that there be supplied an excess of molecular oxygen to the liquid which is undergoing oxidation. The presence of an excess may be ensured by thorough dispersion of the molecular oxygen-containing gas throughout the body of liquid and supplying the gas at such a rate that the gaseous effluence from the reactor contains an appreciable quantity of oxygen, preferably not less than about 5% by volume.

When starting up the continuous multi-stage process of the invention the system is charged with a quantity of the secondary alcohol. The system then is brought to the operating conditions of temperature, pressure, and flow of oxygen-containing gas. As the aeration of the secondary alcohol is continued and while maintaining the liquid scrupulously out of contact with substances which promote decomposition of hydrogen peroxide, peroxidic compounds are formed and are caused to accumulate in the liquid. Apparently through the action of these accumulated peroxidic materials, the reaction which is productive of hydrogen peroxide eventually is initiated. After the production of hydrogen peroxide has been thus initiated the desired reaction, which is autocatalytic, is self-sustaining (assuming, of course, maintenance of the necessary reaction conditions by appropriate control) and continues in the presence and under the influence of the hydrogen peroxide which is continually being formed. When the desired level of hydrogen peroxide has been reached, continuous feed of the secondary alcohol is commenced and the process operated on continuous basis. Commencement of the reaction which is productive of hydrogen peroxide can be accelerated by adding to the initial charge of secondary alcohol a small amount, generally between about 1% and about 15% by weight, of a peroxidic compound, such as an organic peroxide or an inorganic peroxide. Hydrogen peroxide itself may be employed, as by initially charging the crude product from a prior oxidation, alone or with additional secondary alcohol, or a previously prepared solution of hydrogen peroxide in the secondary alcohol may be used. Sodium peroxide, barium peroxide, and calcium peroxide may be employed as the reaction initiator, while as the organic peroxide there may be employed, for example, tertiary-butyl perbenzoate, peracetic acid, di-tertiary-butyl peroxide, tertiary-butyl hydroperoxide, acetone peroxide, 2,2-bis-tertiary-butylperoxy butane, cyclohexanone peroxide, cumene hydroperoxide, and other organic peroxides and hydroperoxides and organic peracids and their esters and salts.

Hydrogen peroxide may be recovered from the crude product issuing from the last of the successive reaction zones by any appropriate method. The crude product preferably is fractionally distilled in the presence of sufficient water to yield, as product of the distillation, an aqueous solution of hydrogen peroxide containing from about 20% to about 50% by weight of hydrogen peroxide, unconsumed alcohol and by-product ketone being recovered separately from the aqueous hydrogen peroxide solution. This solution of hydrogen peroxide may be purified further by another distillation. According to an alternative procedure, the hydrogen peroxide may be freed of traces of organic materials remaining in the solution by precipitation as an insoluble metal peroxide, such as calcium peroxide, barium peroxide, strontium peroxide, or the like, and subsequent regeneration by treatment of an aqueous slurry of the washed precipitate with an acid, such as sulfuric acid, phosphoric acid, carbonic acid, etc.

The accompanying drawing illustrates one of the specific embodiments of the invention. The drawing, which is drawn to no scale, shows partly in elevation and partly in vertical section an arrangement of apparatus suitable for practice of the invention. It will be recognized that certain accessory equipment which may be desirable or even necessary for practice of the method in the illustrated apparatus, has been omitted from the drawing since such accessory equipment can be readily supplied by those skilled in the art. It also will be appreciated that other arrangements of apparatus may be employed without departure from the invention defined by the appended claims.

The drawing shows three reactors, A, B, and C, arranged in series flow with respect to the liquid process stream and in parallel flow with respect to the gas containing molecular oxygen. The three reactors, which may be identical in construction, are constructed of or at least lined with, stainless steel, tin, aluminum, glass, or other material which is compatible with hydrogen peroxide. Valved inlet line 1 is provided for introduction of secondary alcohol feed. Valved inlet line 2 is provided for introduction of hydrogen peroxide stabilizer, for example, as an aqueous solution thereof. Alternatively, the stabilizer may be incorporated in the liquid feed and introduced with the feed via line 1. Connecting lines 3 and 4 are provided for conveying the liquid stream from reactor A to reactor B and thence to reactor C. The valved manifold system comprising lines 5, 6, 7, and 8 leads from a pump (not shown) and is provided for introduction of the gas containing molecular oxygen at or near the lower end of each of the reactors. A dispersing means indicated in the sectional view of reactor A by numeral 9 is provided in each reactor for dispersing and distributing the gas stream into intimate contact with the entire body of liquid in the reactor. Effluent lines 10, 11, and 12 lead from the respective reactors to condensers 13, 14, and 15, respectively. By means of the condensers, volatilized organic materials contained in the gaseous effluent from each reactor are condensed and are returned as reflux to the respective reactors. The condensers preferably may be arranged for total condensation of the volatilized organic materials. In some cases, however, it may be advantageous to include with the condensers fractionating means (not shown) whereby only the volatilized alcohol is condensed and returned to the reactor and the more volatile ketone is withdrawn in vaporous state and subsequently recovered from the gaseous effluence. Valved outlets 16, 17, and 18 are provided for discharge of the spent gas either to the atmosphere, to means for recovering the minor amount of organic materials which may pass the condensers, or to recycle.

From reactor C there is provided line 19 leading to the distillation column wherein the crude reaction product, after dilution with water introduced via line 20 if desired, is fractionated to separate an aqueous hydrogen peroxide solution from the unconsumed alcohol and the by-product ketone. Reboiler 21 is provided for supplying heat to the lower end of the column, and internal condenser 22 is provided for inducing reflux in the column. Bottoms product is discharged from the column via line 23. Overhead product is taken out at line 24 which, if the distillation is to be conducted under a subatmospheric pressure, leads to means for maintaining the reduced pressure, such as a pump or a barometric condenser.

The following examples are illustrative of the invention. It will be appreciated that the examples should not be misconstrued as limiting the invention, which is defined by the appended claims and which it is intended to claim as broadly as the prior art permits.

Example I

A three-stage system was employed. Each oxidation stage was carried out in a pressure-resistant stainless steel reactor about 4 inches in diameter and 5 feet long, positioned with the long axis vertical. The reactors were carefully cleaned with hot caustic solution, thoroughly washed, and then conditioned with 50% aqueous hydrogen peroxide solution prior to start-up of the oxidation. Each reactor was operated at a liquid level corresponding to 11.3 liters liquid content. Liquid feed (isopropyl alcohol-water constant boiling mixture; ca. 12.1% by weight water) was introduced continuously under pressure into the first reactor, and the liquid leaving the first reactor was conveyed successively to the second and then to the third reactor. Separate streams of air were introduced through a disperser into the lower end of each reactor. Spent gas was removed from the top of each reactor, passed through a water-cooled condenser with return of condensate to the reactor, and the cooled residual gas was discharged through a pressure-relief valve set to maintain a nominal pressure of 500 pounds per square inch. The rate of input of air was regulated so as to maintain a content of oxygen in the cooled effluent gas of about 7% by volume. The alcohol fed to the system contained about 15 parts per million of added potassium pyrophosphate.

The reaction was initiated by adding a small amount (ca. 2% by weight) of hydrogen peroxide to the initial portions of the feed; the addition of initiator was discontinued after the reaction was progressing satisfactorily.

The system was brought to steady-state continuous operations by adjustment of the flow rates of isopropyl alcohol feed, air flow, and temperatures of the reactors and thereafter was maintained at a steady state by instrumented regulation of the rate of feed of the alcohol and the temperatures of the reactors. Under the steady-state conditions employed in this run, the feed rate to each reactor corresponded to an LHSV of about 0.5 hr.$^{-1}$. The temperature in the first reactor was 142° C. In the second reactor the temperature was maintained at 133° C., and the third reactor was maintained at a temperature of 127° C. The hydrogen peroxide concentrations in the three reactors were maintained substantially constant at about 2.6% by weight, 5.6% by weight, and 8.4% by weight, respectively, corresponding to an overall conversion of the alcohol equal to about 22%. The yield of hydrogen peroxide based upon the amount of acetone produced was determined by distillation of the collected liquid product withdrawn from the third reactor and was found to be 86%. Organic acids were formed in an amount corresponding to 0.9 mole percent based upon the amount of hydrogen peroxide produced.

In a single-stage continuous oxidation of isopropyl alcohol (supplied as the azeotropic mixture with water) in the presence of 15 parts per million of potassium pyrophosphate, at a reaction temperature of 144° C. and a flow rate corresponding to an LHSV of 0.49 hr.$^{-1}$, the steady-stage concentration of hydrogen peroxide in the reactor contents was 8.5% by weight, the conversion of the alcohol fed was 23.5%, and the yield of hydrogen peroxide based upon the amount of acetone produced was 83%. However, the amount of acid produced was approximately double the amount of acid produced in the preceding three-stage operation.

*Example II*

The advantages of the present invention are particularly apparent when the oxidation is carried to high once-through conversions of the secondary alcohol. In a two-stage continuous operation, employing reactors similar to those described in the preceding example, isopropyl alcohol-water constant boiling mixture was oxidized continuously at steady-state conditions of temperatures of 143° C. and 132° C. in the first and second stages, respectively, a feed rate corresponding to an LHSV of 0.24 based upon the total of the volume of the two reactors, under a pressure of about 500 pounds per square inch, and in the presence of about 15 parts per million of potassium pyrophosphate added to the liquid feed. The oxidation proceeded smoothly and was readily controlled. The conversion of the isopropyl alcohol fed was about 32.5% at the steady-state, and the concentration of hydrogen peroxide in the final product was about 11.1% by weight. The content of organic acid in the effluent from the second stage was about 6.8 millimols per 100 grams. In a single-stage continuous operation carried to a hydrogen peroxide concentration of 9.9% by weight at steady-state operation, the content of organic acid in the liquid undergoing oxidation already is 10 millimols per 100 grams, a level sufficiently high under these conditions to make the reaction delicate to control and liable, because of its autocatalytic character, to get out of control with appreciable danger to equipment and operators in the event that it does get out of control.

*Example III*

In a five-stage oxidation of isopropyl alcohol according to the process of the invention, expanded equipment similar to that described in Example I was used. The conditions in the five reactors were as shown in the following table:

| Reactor | Temperature, ° C. | LHSV, hr.$^{-1}$ | H$_2$O$_2$ concentration, percent, weight | Cumulative conversion of isopropyl alcohol |
|---|---|---|---|---|
| First | 140 | 0.38 | 4.2 | 9.0 |
| Second | 135 | 0.91 | 6.4 | 15.7 |
| Third | 133 | 0.92 | 9.0 | 23.3 |
| Fourth | 127 | 0.95 | 10.7 | 30.2 |
| Fifth | 128 | 0.93 | 12.7 | 41.9 |

Conditions common to the five reactors were: nominal pressure of 500 pounds per square inch, air feed, and 15 parts per million potassium pyrophosphate in the liquid undergoing oxidation. The steady-state concentration of acid in the product withdrawn from the fifth reactor was 7.48 millimols per 100 grams of product, a concentration at which, notwithstanding the high conversion of the alcohol feed, the reaction still is susceptible to control without difficulty.

We claim as our invention:

1. A process for the production of hydrogen peroxide by non-photochemical partial oxidation of a secondary alcohol in liquid phase, which comprises, passing a liquid comprising only secondary alcohol as progenitor of hydrogen peroxide through a succession of non-photochemical reaction zones each maintained at a reaction temperature above about 70° C., in which hydrogen peroxide is substantially stable, in each of said successive zones aerating the liquid with a stream of gas containing molecular oxygen in the presence of a substantially constant and, from zone to zone in succession, a progressively increasing concentration of hydrogen peroxide, and regulating the temperatures of the successive reaction zones so that the reaction temperature decreases progressively from zone to zone in the direction of liquid flow by a differential of from about 2° C. to about 20° C. between successive zones, and withdrawing liquid product comprising hydrogen peroxide from the last of said zones.

2. A process for the production of hydrogen peroxide defined by claim 1 in which the secondary alcohol is isopropyl alcohol.

3. A process for the production of hydrogen peroxide defined by claim 2 in which said liquid initially consists essentially of isopropyl alcohol-water constant boiling mixture.

4. A process for the production of hydrogen peroxide by non-photochemical partial oxidation of a secondary alcohol in liquid phase, which comprises, passing a liquid comprising only secondary alcohol as progenitor of hydrogen peroxide through a succession of from 3 to about 8 non-photochemical reaction zones in which hydrogen peroxide is substantially stable and maintained at temperatures within the range of from about 70° C. to about 200° C., in each of said zones aerating the liquid with a stream of gas containing molecular oxygen at a pressure sufficient to maintain a liquid state in the presence in each zone of a substantially constant concentration of hydrogen peroxide and, from zone to zone in succession, progressively increasing concentrations of hydrogen peroxide and at temperatures progressively decreasing by decrements of from 2 to 20° C., and withdrawing liquid product comprising hydrogen peroxide from the last of said zones.

5. A process for the production of hydrogen peroxide which comprises passing a liquid comprising as the sole progenitor of hydrogen peroxide a secondary alcohol in liquid state through a succession of from 3 to about 8 non-photochemical reaction zones in which hydrogen peroxide is substantially stable and the first of which is maintained at a temperature within the range of from about 150° C. to about 200° C., in each of said zones aerating the liquid with a stream of gas containing molecular oxygen at a pressure sufficient to maintain the liquid state in the presence in each zone of a substantially constant concentration of hydrogen peroxide and, from zone to zone in succession, progressively increasing concentrations of hydrogen peroxide and at temperatures progressively decreasing by decrements of from 2 to 20° C., withdrawing liquid product from the last of said zones and recovering hydrogen peroxide from said liquid product.

6. A process for the production of hydrogen peroxide defined by claim 5 in which the secondary alcohol is isopropyl alcohol.

7. A process for the production of hydrogen peroxide which comprises passing a liquid comprising as the sole progenitor of hydrogen peroxide a secondary alcohol in liquid state through a succession of non-photochemical reaction zones in which hydrogen peroxide is substantially stable and maintained at temperatures within the range of from about 70° C. to about 200° C., the number of said zones being equal to $n$ where $n$ represents an integer having a value of from 3 to about 8, in each of said successive zones aerating the liquid with a stream of gas containing molecular oxygen in the presence in each zone of a substantially constant and, from zone to zone in succession, progressively increasing concentrations of hydrogen peroxide and temperatures progressively decreasing from zone to zone by decrements of from 2 to 20° C., regulating the temperature and residence time in each zone so that of the total percentage conversion of the secondary alcohol initially present in said liquid stream approximately $1/n$th occurs in each zone, withdrawing liquid product from the last of said zones and recovering hydrogen peroxide from said liquid product.

8. A process for the production of hydrogen peroxide defined by claim 7 in which $n$ is equal to 3.

9. A process for the production of hydrogen peroxide defined by claim 7 in which $n$ is equal to 4.

10. A process for the production of hydrogen peroxide defined by claim 7 in which the secondary alcohol is isopropyl alcohol.

References Cited in the file of this patent

UNITED STATES PATENTS

| | | |
|---|---|---|
| 2,115,206 | Milas | Apr. 26, 1938 |
| 2,158,525 | Riedl et al. | May 16, 1939 |
| 2,456,683 | Deanesly | Dec. 21, 1948 |
| 2,479,111 | Harris | Aug. 16, 1949 |

OTHER REFERENCES

Slater et al.: "The Anthraquinone Autoxidation Process for the Production of Hydrogen Peroxide," P. B. 4336, pages 4–10, March 29, 1946.

Weissberger: "Technique of Organic Chemistry," 1950, vol. III, pages 295–297.

Mellan: "Industrial Solvents," 2nd ed., 1950, page 468.

Hildebrand: "Principles of Chemistry," 5th ed. Combined volume, page 171, published 1947 by the MacMillan Co., N. Y., N. Y.

Walton et al.: "Journal of American Chem. Soc.," vol. 54, pages 3228–3229 (Aug. 1932).

UNITED STATES PATENT OFFICE
CERTIFICATE OF CORRECTION

Patent No. 2,871,103 — January 27, 1959

John R. Skinner et al.

It is hereby certified that error appears in the printed specification of the above numbered patent requiring correction and that the said Letters Patent should read as corrected below.

Column 1, line 45, the formula should appear as shown below instead of as in the patent —

$$(CH_3)_2CH(OH) + O_2 = (CH_3)_2C=O + H_2O_2$$

Signed and sealed this 2nd day of June 1959.

(SEAL)
Attest:

KARL H. AXLINE
Attesting Officer

ROBERT C. WATSON
Commissioner of Patents